W. G. NUTT.
FRUIT JAR HOLDER.
APPLICATION FILED MAR. 1, 1916.
1,219,347.
Patented Mar. 13, 1917.
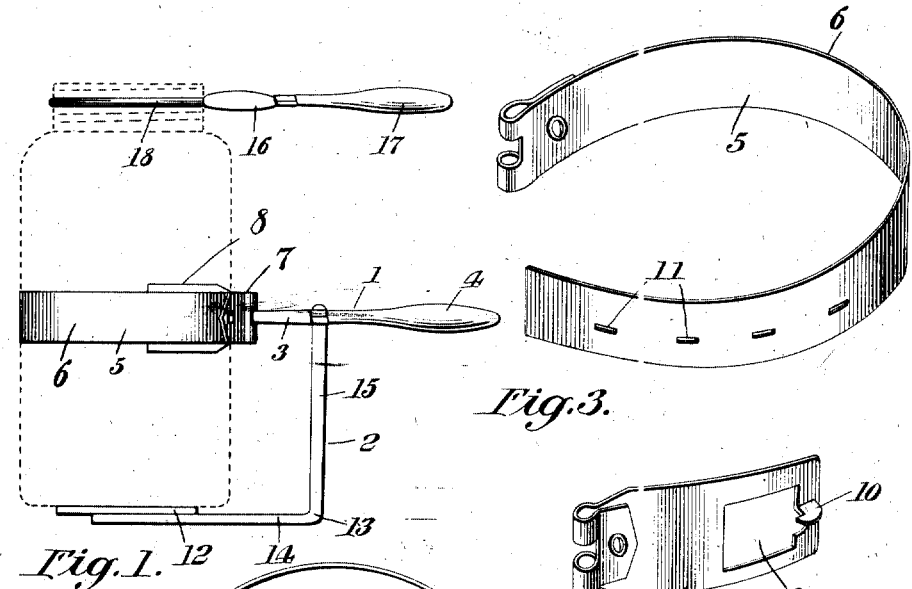
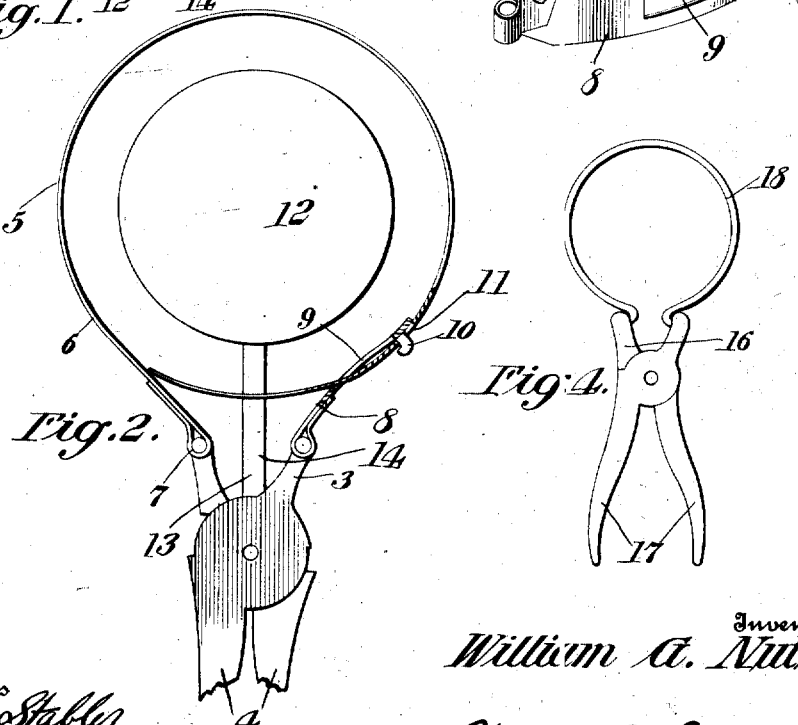
Witnesses
Louis A. Stabler
J. W. Garner
Inventor
William G. Nutt,
By Victor J. Evans
Attorney

UNITED STATES PATENT OFFICE.

WILLIAM G. NUTT, OF JONESBORO, ARKANSAS.

FRUIT-JAR HOLDER.

1,219,347.  Specification of Letters Patent.  Patented Mar. 13, 1917.

Application filed March 1, 1916. Serial No. 81,520.

*To all whom it may concern:*

Be it known that I, WILLIAM G. NUTT, a citizen of the United States, residing at Jonesboro, in the county of Craighead and State of Arkansas, have invented new and useful Improvements in Fruit-Jar Holders, of which the following is a specification.

This invention is an improved fruit jar holder especially adapted for use in handling a hot fruit jar, when holding the same over a hot pan of fruit while being filled, the object of the invention being to provide an improved device of this character which embodies a clamping element and also embodies a jar supporting bracket connected to and carried by the clamping element and on which the bottom of the jar rests when the holder is in use, thereby preventing all possibility of the jar from accidentally slipping from the clamping element.

The invention consists in the construction, combination and arrangement of devices hereinafter described and claimed.

In the accompanying drawings:—

Figure 1 is an elevation of the fruit jar holder constructed in accordance with my invention and showing the same in use on a fruit jar, the latter being indicated in dotted outline.

Fig. 2 is a plan of the same partly in section.

Fig. 3 is a detail view of the clamping band.

Fig. 4 is a plan view of a wrench for use in connection with the jar holder.

My improved fruit jar holder comprises a clamping element 1 and a supporting element 2. The clamping element is here shown as comprising a pair of pivotally connected jaws 3 each of which has a handle 4, and also comprises a longitudinally adjustable band 5 to pass around and clamp the jar. Said band comprises a main member 6 which is pivotally attached as at 7 to one of the jaws and also comprises a member 8 which is pivotally connected to the other jaw and has an opening 9 through which the free end of the member 6 extends and in which said member is adjustable. The member 8 has an outwardly projecting hook 10 at its upper end and the member 6 has a series of adjusting openings 11 any one of which may be engaged with said hook. Hence the clamping band may be adjusted as required to adapt it to fit around a jar of any size.

The supporting member 2 is here shown as a disk 12 adapted to bear under the center of the bottom of the jar and also comprises a right angled bracket member 13 having a horizontal arm 14 and a vertical arm 15. The upper end of the vertical arm 15 forms the pivot which connects the jaws 3 together, as shown.

When the jar holder is in use the bottom of the jar bears on the disk of the supporting element and the band of the clamping element passes around the jar so that the jar is very firmly and securely held and there is no danger of its being casually detached from the holder. The disk 12 may be readily turned rearwardly from under the jar and clamping band and may be arranged under the lever arms 4 when desired.

The wrench shown in Fig. 4 and which may be used in connection with my holder for taking off or putting on fruit jar caps comprises a pair of pivotally connected jaws 16 and having lever arms 17 and connected together by an open jar cap engaging wire band 18.

While I have herein shown and described the preferred form of my invention I would have it understood that changes may be made in the form, construction and arrangement of the several parts without departing from the spirit of my invention and within the scope of the appended claim.

Having thus described my invention what I claim is:—

A fruit jar holder comprising a clamping element embodying a pair of pivotally connected lever members and a clamping band connected and operated by said lever members and a supporting member for arrangement under the bottom of a jar, said supporting member having an upstanding arm which holds the clamping element and also forms the pivot for the lever members thereof.

In testimony whereof I affix my signature in presence of two witnesses.

WILLIAM G. NUTT.

Witnesses:
G. W. NUTT,
M. R. LOCKARD.